(12) United States Patent
Seaman et al.

(10) Patent No.: US 10,698,698 B2
(45) Date of Patent: Jun. 30, 2020

(54) SYSTEM AND METHOD FOR INITIALIZING SOFTWARE APPLICATIONS

(71) Applicant: MZ IP Holdings, LLC, Palo Alto, CA (US)

(72) Inventors: Brendan Seaman, Mountain View, CA (US); Sebastian Plehn, Hamburg (DE)

(73) Assignee: MZ IP Holdings, LLC, Palo Alto, CA (US)

(*) Notice: Subject to any disclaimer, the term of this patent is extended or adjusted under 35 U.S.C. 154(b) by 0 days.

(21) Appl. No.: 15/901,396

(22) Filed: Feb. 21, 2018

(65) Prior Publication Data
US 2018/0275996 A1 Sep. 27, 2018

Related U.S. Application Data

(60) Provisional application No. 62/475,435, filed on Mar. 23, 2017.

(51) Int. Cl.
*G06F 9/445* (2018.01)
*G06F 8/61* (2018.01)
*H04L 29/08* (2006.01)

(52) U.S. Cl.
CPC ............. *G06F 9/445* (2013.01); *G06F 8/61* (2013.01); *H04L 67/34* (2013.01)

(58) Field of Classification Search
CPC ............ G06F 9/445; G06F 8/61; H04L 67/34
USPC ........................................................ 717/178
See application file for complete search history.

(56) References Cited

U.S. PATENT DOCUMENTS

| | | | |
|---|---|---|---|
| 9,842,119 B1* | 12/2017 | Schwartz | H04L 41/0813 |
| 2004/0237082 A1 | 11/2004 | Alcazar et al. | |
| 2010/0253817 A1* | 10/2010 | Ali | G06T 3/4015 |
| | | | 348/273 |
| 2010/0257446 A1* | 10/2010 | Woolfe | G06F 3/1204 |
| | | | 715/274 |
| 2010/0324983 A1* | 12/2010 | Etchegoyen | G06F 21/10 |
| | | | 705/14.23 |
| 2014/0111516 A1* | 4/2014 | Hall | G06T 11/60 |
| | | | 345/428 |
| 2014/0207964 A1* | 7/2014 | Philpott | H04L 65/4084 |
| | | | 709/231 |

(Continued)

OTHER PUBLICATIONS

Cheng et al., "Priority-driven Coding and Transmission of Progressive JPEG Images for Real-Time Applications," The Journal of VLSI Signal Processing, 2007 47(2): 169-182.

(Continued)

*Primary Examiner* — Anna C Deng
(74) *Attorney, Agent, or Firm* — Goodwin Procter LLP (57) ABSTRACT

Implementations of the present disclosure are directed to a method, a system, and an article for reducing start-up times for software applications. An example computer-implemented method can include: initiating a software application on a client device; downloading on the client device an initial portion of data configured to render an operable version of the software application; providing the operable version of the software application on the client device; downloading on the client device a remaining portion of data configured to render a complete version of the software application; and providing the complete version of the software application on the client device.

19 Claims, 4 Drawing Sheets

(56) References Cited

U.S. PATENT DOCUMENTS

2017/0083310 A1* 3/2017 Barry ................... G06F 8/71
2017/0111322 A1* 4/2017 Patidar ............... H04L 63/0281

OTHER PUBLICATIONS

Int'l Search Report and Written Opinion of the ISA/EP in PCT/US2018/018919; dated Jun. 7, 2018; 14 pgs.

* cited by examiner

FIG. 4

SYSTEM AND METHOD FOR INITIALIZING SOFTWARE APPLICATIONS

CROSS-REFERENCE TO RELATED APPLICATIONS

This application claims the benefit of U.S. Provisional Patent Application No. 62/475,435, filed Mar. 23, 2017, the entire contents of which are incorporated by reference herein.

BACKGROUND

The present disclosure relates to software applications and, in certain examples, to systems and methods for improving the initialization of software applications on client devices.

Software applications that rely on data from a server system or a content delivery network (CDN) typically suffer from long start-up times before being able to present a user with a functional user interface. In general, such applications can be used only after all the required metadata, image data, and other asset data has been downloaded or otherwise gathered. The time required to download such data for some applications can be 30 seconds, 60 seconds, or longer. This can frustrate users and result in lost opportunities for software application providers.

Many software applications download start-up data from CDNs. A CDN is typically a large system of servers or nodes distributed around the world that provide content and other data to client devices through a network connection (e.g., the Internet). In general, CDNs allow content to be distributed to end users quickly and reliably, without requiring content developers or providers to make significant investments in new hardware or infrastructure.

SUMMARY

In general, the subject matter of this disclosure relates to systems and methods for reducing an amount of time required to start-up a software application on a client device that relies on data from a server system or a CDN. Before downloading all the data required to make the software application fully operable, for example, the client device and/or the software application can first download an initial portion of data, which can be or include a small dedicated metadata database, referred to herein as a "provisional metadata database." The initial portion of data preferably includes interim metadata information necessary to initialize a state of the software application and to render the software application operational or fully functional. The interim metadata information can include, for example, image dimensions, positional/spatial data, animation clip lengths, asset dependency information, and other similar information. Once the interim metadata has been downloaded and processed, a user can run and use an initial, operable version of the software application. The initial version can include a user interface and be fully functional, though certain assets (e.g., images, animations, and videos) that have not yet been downloaded can be substituted by placeholder assets (e.g., lower quality or primitive versions of actual assets). The actual asset data can then be downloaded over time to replace the placeholder assets and provide a final or complete version of the software application.

Advantageously, the approach described herein is able to significantly reduce start-up times for certain software applications. In some instances, for example, a time between the initialization of a software application and the presentation of an operable user interface can be reduced by 75%, 90%, or more, using the systems and methods described herein. This can greatly reduce user frustration and improve overall user satisfaction with the software application.

In one aspect, the subject matter described in this specification relates to a computer-implemented method. The method includes: initiating a software application on a client device; downloading on the client device an initial portion of data configured to render an operable version of the software application; providing the operable version of the software application on the client device; downloading on the client device a remaining portion of data configured to render a complete version of the software application; and providing the complete version of the software application on the client device.

In certain examples, initiating the software application can include requesting a manifest file from a content delivery network, and the manifest file can include an identification of the initial portion of data and the remaining portion of data. The initial portion of data can include interim metadata for the software application. The interim metadata can include a user interface layout, an image dimension, a mesh dimension, a length of an animation, positional data, spatial data, and any combination thereof. The operable version of the software application can include a primitive rendering of an image, graphical element, animation, video, and/or sound from the complete version of the software application.

In some instances, the operable version and the complete version can include an identical functionality. The operable version can be identical to the complete version, other than a graphics quality and/or a sound quality. Downloading the remaining portion of data can include enabling the user to interact with the operable version. Downloading the remaining portion of data can include: determining a current state of the software application; and prioritizing a first subset of the remaining portion of data for download over a second subset of the remaining portion of data, based on the determination of the current state. The remaining portion of data can include image data and/or 3D object data.

In another aspect, the subject matter described in this specification relates to a system having one or more computer processors programmed to perform operations including: initiating a software application on a client device; downloading on the client device an initial portion of data configured to render an operable version of the software application; providing the operable version of the software application on the client device; downloading on the client device a remaining portion of data configured to render a complete version of the software application; and providing the complete version of the software application on the client device.

In certain implementations, initiating the software application can include requesting a manifest file from a content delivery network, and the manifest file can include an identification of the initial portion of data and the remaining portion of data. The initial portion of data can include interim metadata for the software application. The interim metadata can include a user interface layout, an image dimension, a mesh dimension, a length of an animation, positional data, spatial data, and any combination thereof. The operable version of the software application can include a primitive rendering of an image, graphical element, animation, video, and/or sound from the complete version of the software application.

In various examples, the operable version and the complete version can include an identical functionality. The operable version can be identical to the complete version, other than a graphics quality and/or a sound quality. Downloading the remaining portion of data can include enabling the user to interact with the operable version. Downloading the remaining portion of data can include: determining a current state of the software application; and prioritizing a first subset of the remaining portion of data for download over a second subset of the remaining portion of data, based on the determination of the current state. The remaining portion of data can include image data and/or 3D object data.

In another aspect, the subject matter described in this specification relates to an article. The article includes a non-transitory computer-readable medium having instructions stored thereon that, when executed by one or more computer processors, cause the computer processors to perform operations including: initiating a software application on a client device; downloading on the client device an initial portion of data configured to render an operable version of the software application; providing the operable version of the software application on the client device; downloading on the client device a remaining portion of data configured to render a complete version of the software application; and providing the complete version of the software application on the client device.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

Figure 1:
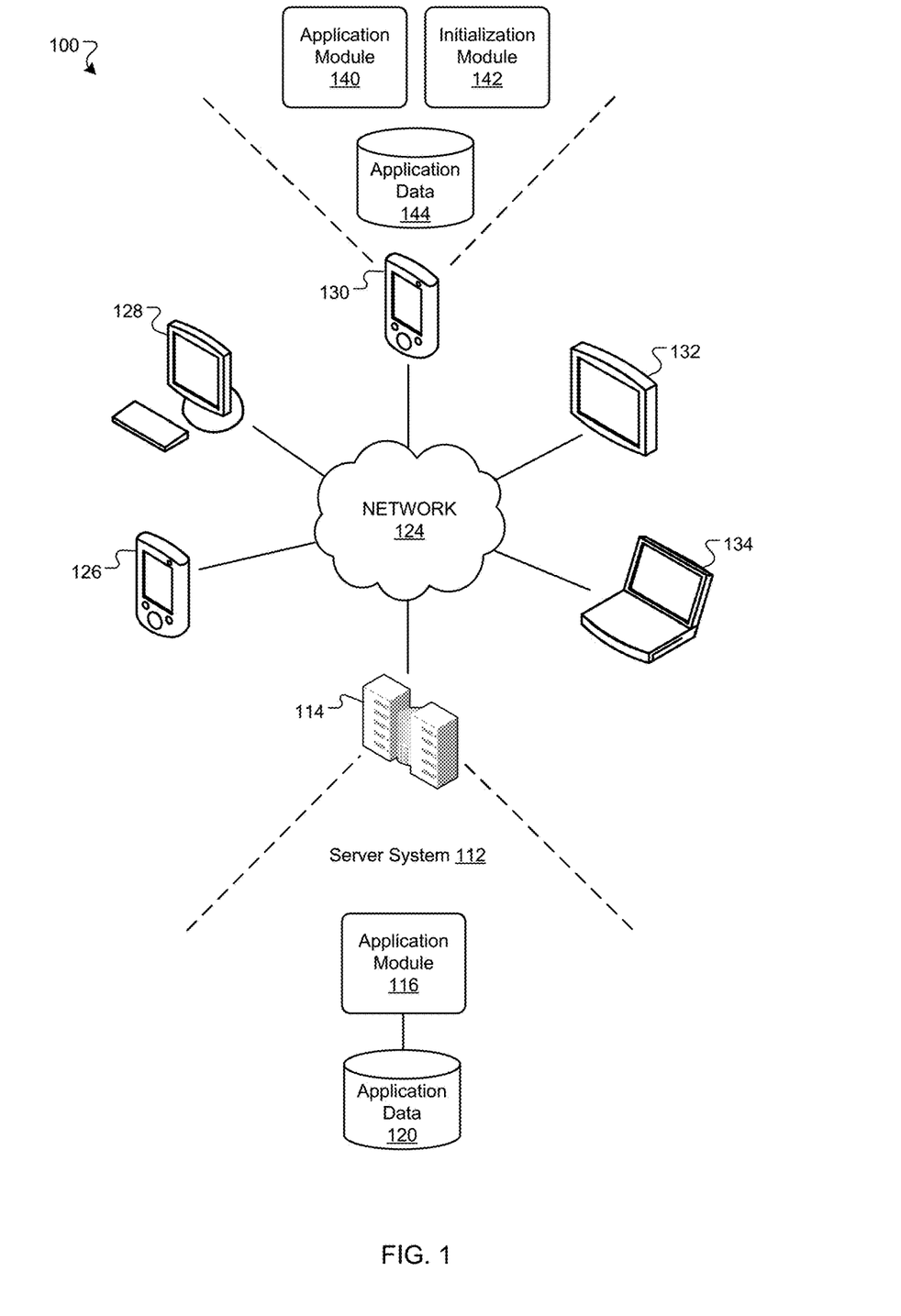
FIG. 1 is a schematic diagram of an example system for managing the initialization of software applications running on client devices.

FIG. 1 illustrates an example system 100 for improving the initialization of a software application on a client device. A server system 112 provides functionality for initializing the software application and providing the software application to a plurality of users. The server system 112 includes software components and databases that can be deployed at one or more data centers 114 in one or more geographic locations, for example. In certain instances, the server system 112 is, includes, or utilizes a content delivery network (CDN). The server system 112 software components can include an application module 116 and/or can include sub-components that can execute on the same or on different individual data processing apparatus. The server system 112 databases can include an application data 120 database. The databases can reside in one or more physical storage systems. The software components and data will be further described below.

An application, such as, for example, a web-based or other software application can be provided as an end-user application to allow users to interact with the server system 112. The software application or components thereof can be accessed through a network 124 (e.g., the Internet) by users of client devices, such as a smart phone 126, a personal computer 128, a smart phone 130, a tablet computer 132, and a laptop computer 134. Other client devices are possible.

Each client device in the system 100 can utilize or include software components and databases for the software application. The software components on the client devices can include an application module 140 and an initialization module 142. The application module 140 can implement the software application on each client device. The initialization module 142 can be used to manage an initialization or start-up phase for the software application. The databases on the client devices can include an application data 144 database, which can store data for the software application and exchange the data with the application module 140 and/or the initialization module 142. The data stored on the application data 144 database can include, for example, user data, image data, video data, and any other data used or generated by the application module 140 and/or the initialization module 142. While the application module 140, the initialization module 142, and the application data 144 database are depicted as being associated with the smart phone 130, it is understood that other client devices (e.g., the smart phone 126, the personal computer 128, the tablet computer 132, and/or the laptop computer 134) can include the application module 140, the initialization module 142, the application data 144 database, and any portions thereof.

Still referring to FIG. 1, the application module 116 can include software components that support the software application by, for example, performing calculations, implementing software updates, exchanging information or data with the application module 140 and/or the initialization module 142, assisting with the initialization of the software application, and/or monitoring an overall status of the software application. The application data 120 database can store and provide data for the software application. The data can include, for example, user data, image data, video data, animation data, and/or any other data that can be used by the server system 112 and/or client devices to run the software application. In certain instances, for example, the application module 116 can retrieve data (e.g., video data or image data) from the application data 120 database and send the data to client devices during the initialization of the software application.

The software application implemented on the client devices 126, 128, 130, 132, and 134 can relate to and/or provide a wide variety of functions and information, including, for example, entertainment (e.g., a game, music, videos, etc.), business (e.g., word processing, accounting, spreadsheets, etc.), news, weather, finance, sports, etc. In certain instances, the software application provides a multi-player online game.

Figure 2:
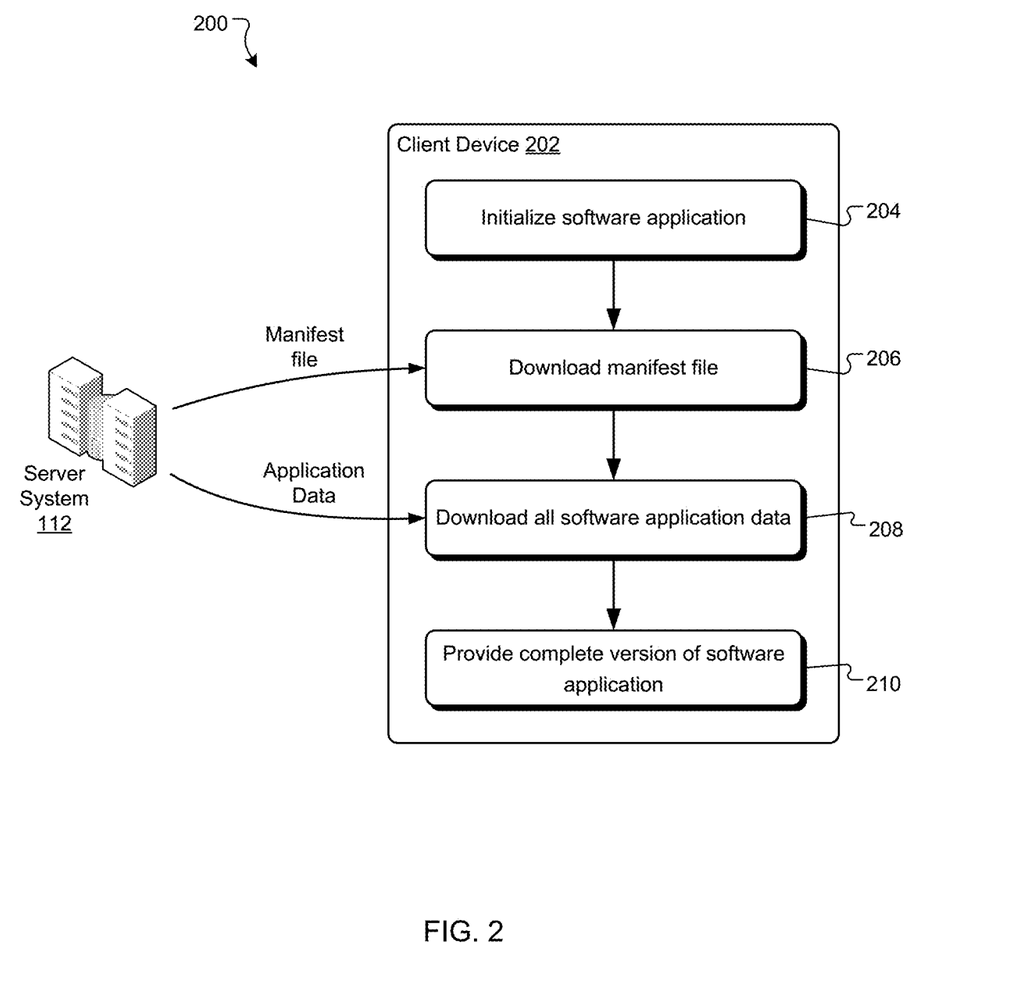
FIG. 2 is a schematic diagram of an example method of starting up a software application on a client device.

Referring to FIG. 2, an example method 200 of initializing a software application on a client device 202 (e.g., the smart phone 130) can involve retrieving certain assets and other data from the server system 112 (e.g., a CDN). The method 200 can begin by initializing (step 204) the software application on the client device 202, for example, in response to a user selection of the software application. The software application and/or the client device 202 (e.g., using the initialization module 142) can then request and download (step 206) a manifest file from the server system 112. The manifest file can include a listing or indication of all the files and/or data (e.g., asset data) that will be downloaded by the client device 202 and/or updated on the client device 202 before the software application can be rendered operable. The software application and/or the client device 202 can then proceed to request and download (step 208) all the files and/or data identified in the manifest file. Once all the files and/or data has been downloaded, a complete and fully operable version of the software application can be provided (step 210) on the client device.

In certain instances, however, the method 200 can suffer from long initialization or start-up times before all the files and/or data has been downloaded (at step 208) and an operable version of the software application (e.g., with a functional user interface) can be provided (at step 210) on the client device. A large portion (e.g., 75%, 90%, or more) of the start-up time can be associated with downloading certain large files, for example, related to video, image, and/or animation data.

To avoid the long start-up times associated with the method 200, a dedicated database, referred to herein as the "provisional metadata database," can be downloaded from the server system 112 first or before other files and/or data for the software application. The provisional metadata database can include an initial portion of data, referred to as "interim metadata information," that can be used to render the software application operable or fully functional during an initialization phase, even though a remaining portion of data has not yet been downloaded or is not yet available for the software application. The interim metadata information can be or include, for example, a layout of a user interface (e.g., element sizes and locations), image dimensions (e.g., for the user interface), mesh dimensions (e.g., for 3D virtual objects), positional data (e.g., locations and/or coordinates for objects on a display screen), spatial data (e.g., sizes, dimensions, and/or bounding volumes for objects, data structures used to partition objects in a scene based on position and size, such as binary space partition trees, etc.), animation clip length (e.g., a length of 3D animations), asset dependency information (e.g., one asset depends on information from another asset to be represented fully), and other similar information. In some instances, the layout of the user interface can be calculated based on image dimensions and/or available screen space. In general, the interim metadata information includes information that can be necessary to initialize the software application, provide a user interface, and/or render the software application operable or fully functional during the initialization phase, while actual or remaining asset data is being downloaded. Advantageously, an initial, operable or fully functional version of the software application can be loaded once the interim metadata information has been downloaded and/or processed by the client device.

In certain implementations, the initial version can include or utilize certain placeholder assets to represent actual assets that have not yet been downloaded or are in the process of being downloaded. The placeholder assets can be or include, for example, low quality or primitive versions (e.g., low resolution images, meshes, or outlines) of assets that have not yet been downloaded, such as, for example, one or more images, 3D virtual objects, videos, animations, graphical elements, and/or similar assets or data. Such placeholder assets can be used to provide an operable software application and/or a better user experience. As actual or higher-quality assets are downloaded, the placeholder assets can be replaced by the actual assets.

Figure 3:
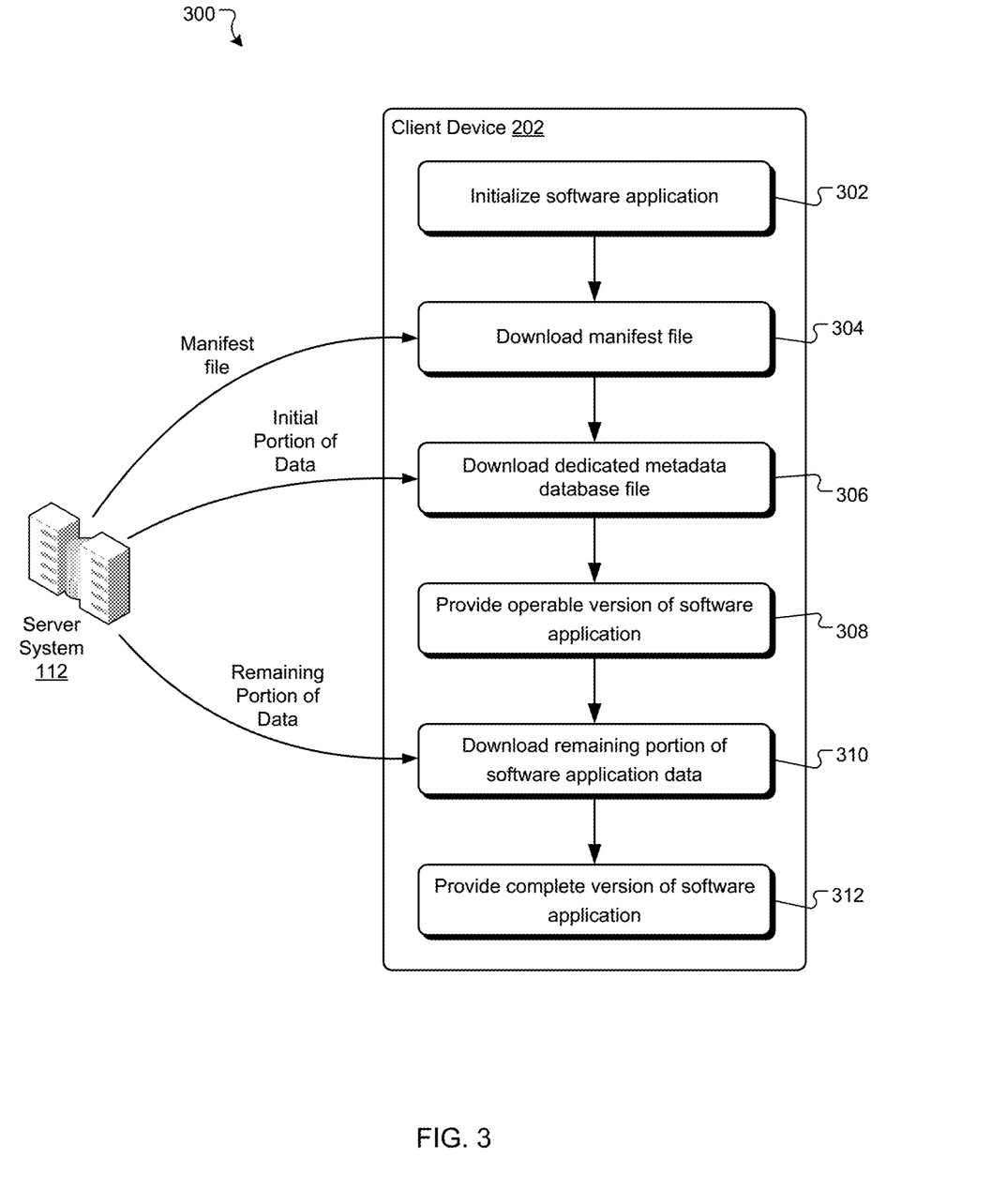
FIG. 3 is a schematic diagram of an example method of reducing a start-up time for a software application on a client device.

For example, referring to FIG. 3, a method 300 can reduce application start-up times by downloading the interim metadata information (e.g., in the provisional metadata database) before other assets and/or files are downloaded for the software application. The method 300 can begin by initializing (step 302) the software application on the client device 202, for example, in response to a user selection of the software application. The software application and/or the client device 202 (e.g., using the initialization module 142) can then request and download (step 304) a manifest file from the server system 112. The manifest file can include a listing or indication of all the files and/or data (e.g., asset data) that will be downloaded by the client device 202 and/or updated on the client device 202 (e.g., in the application data 144 database) to provide the software application. The manifest file can also identify the provisional metadata database that includes interim metadata information. The software application and/or the client device 202 (e.g., using the initialization module 142) can then request and download (step 306) the provisional metadata database from the server system 112.

Once downloaded, an initial, operable version of the software application (e.g., the application module 140) can be provided (step 308) on the client device 202. The initial version can include a user interface and/or any other information required to provide an operable or fully functional version of the software application. The initial version can include or utilize placeholder assets for any assets that have not yet been downloaded. The software application and/or the client device 202 (e.g., using the initialization module 142) can then request and/or download (step 310) the remaining portion of data for the software application. The remaining portion of data can arrive and/or be processed (e.g., asynchronously) in a background, while the client device 202 is providing the initial version of the software application. As additional assets in the remaining data are received, placeholder assets can be replaced with corresponding actual assets. Once all files and/or data for the software application (e.g., as identified in the manifest file) have been downloaded, a complete and fully operable version of the software application can be provided (step 312) on the client device.

In preferred implementations, the initial version of the software application and the complete version of the software application can have identical or substantially similar functionality. For example, the initial and complete versions of the software application can be identical, other than differences in graphics and/or audio. Such differences can be due to, for example, the use of placeholder assets in the initial version and the use of actual assets in the complete version. As a result, a user of the software application can interact with the initial version the same way the user would interact with the complete version. Alternatively or additionally, the initial version and the complete version can process user requests and/or present information in a same or substantially similar manner.

To further reduce start-up times for the software application, certain files, data, or other assets can be bundled with the software application, such that a portion of the assets can reside on the client device (e.g., in the application data 144 database) when the software application is first initialized and do not need to be downloaded. This can reduce a total time required to download files for the software application (e.g., the initial version and/or the complete version).

Additionally or alternatively, downloads can be prioritized so that more important or critical files and/or data can be downloaded before other, less important files and/or data. For example, in addition to downloading the interim metadata information early, to provide the initial version of the software application, further downloads can be prioritized to improve the initial version and/or to enhance a user experience. In the context of a game having a virtual environment, for example, it can be desirable to prioritize the downloading of assets that are in an immediate vicinity of the user (or the user's avatar) in the virtual environment. This way, when the virtual environment is displayed for the user, assets in the vicinity of the user can be downloaded and rendered more quickly and accurately, with minimal use of placeholder assets. In some instances, the systems and methods can prioritize downloads for the game according to where the user is traveling in the virtual environment. For example, if the user is traveling in a northerly direction, assets to the north of the user can be prioritized over other assets.

Additionally or alternatively, further downloads can be prioritized according to asset cross-dependencies. If one asset cannot be used, represented, or displayed until another asset is downloaded, for example, both assets should be downloaded together or at about the same time. In certain examples, the initialization module 142 can identify such asset cross-dependencies (e.g., based on the interim metadata information) and prioritize downloads so that dependent assets can be downloaded together. For example, a 3D model can include geometry, animation, textures, and/or shaders. Geometry can be stored in the 3D model asset, and other data for the 3D model can be stored in separate files, which can be referenced by the 3D model asset. A full representation of the 3D model can require all of this data to be downloaded and processed, such that the 3D model asset can be considered to be dependent on texture, animation, and shader assets. In another example, a 3D model file can rely on a texture asset or image file in order to be rendered in an intended form. The 3D model file and the image file in this case can be cross-dependent and/or are preferably downloaded together or at about the same time.

Figure 4:
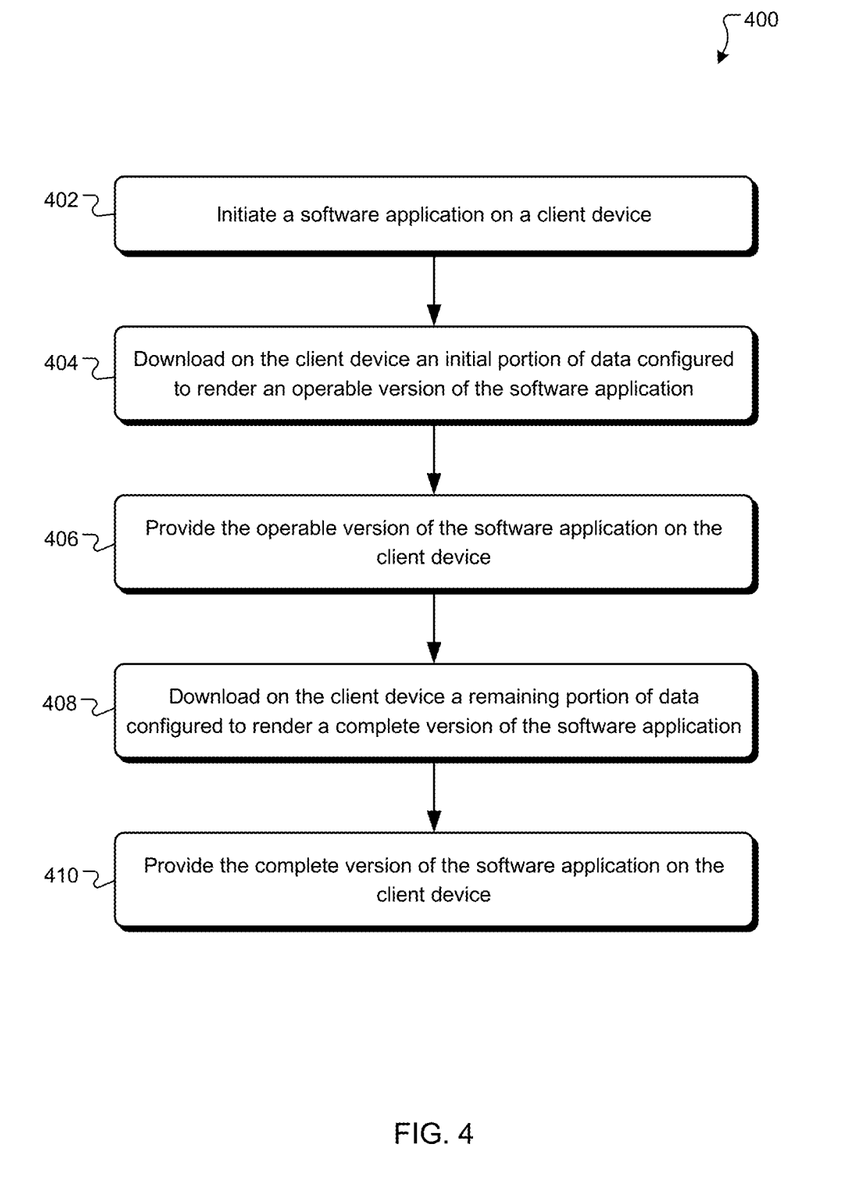
FIG. 4 is a flowchart of an example method of reducing a start-up time for a software application on a client device.

FIG. 4 illustrates an example computer-implemented method 400 of reducing a start-up time of a software application on a client device. A software application is initiated (step 402) on a client device. An initial portion of data configured to render an operable version of the software application is downloaded (step 404) on the client device. The operable version of the software application is provided (step 406) on the client device. A remaining portion of data configured to render a complete version of the software application is downloaded (step 408) on the client device. Finally, the complete version of the software application is provided (step 410) on the client device.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method of reducing a start-up time for a software application installed on a client device, comprising:
    initiating the software application installed on the client device;
    downloading on the client device an initial portion of start-up data configured to render an operable version of the software application,
        wherein the initial portion of start-up data comprises at least one of a user interface layout, an image dimension, a mesh dimension, a length of an animation, positional data, or spatial data;
    providing the operable version of the software application on the client device;
    downloading on the client device a remaining portion of start-up data configured to render a complete version of the software application,
        wherein the remaining portion of start-up data comprises at least one asset configured to replace a placeholder asset in the operable version of the software application; and
    providing the complete version of the software application on the client device.

2. The method of claim 1, wherein initiating the software application comprises:
    requesting a manifest file from a content delivery network, the manifest file comprising an identification of the initial portion of start-up data and the remaining portion of start-up data.

3. The method of claim 1, wherein the initial portion of start-up data comprises interim metadata for the software application.

4. The method of claim 1, wherein the operable version of the software application comprises a primitive rendering of at least one image, graphical element, animation, video, or sound from the complete version of the software application.

5. The method of claim 1, wherein the operable version and the complete version comprise an identical functionality.

6. The method of claim 1, wherein the operable version is identical to the complete version, other than at least one of a graphics quality or a sound quality.

7. The method of claim 1, wherein downloading the remaining portion of start-up data comprises:
enabling the user to interact with the operable version.

8. The method of claim 1, wherein downloading the remaining portion of start-up data comprises:
determining a current state of the software application; and
prioritizing a first subset of the remaining portion of start-up data for download over a second subset of the remaining portion of start-up data, based on the determination of the current state.

9. The method of claim 1, wherein the remaining portion of start-up data comprises at least one of image data or 3D object data.

10. A system for reducing a start-up time for a software application installed on a client device, comprising:
one or more computer processors programmed to perform operations comprising:
initiating the software application installed on the client device;
downloading on the client device an initial portion of start-up data configured to render an operable version of the software application,
wherein the initial portion of start-up data comprises at least one of a user interface layout, an image dimension, a mesh dimension, a length of an animation, positional data, or spatial data;
providing the operable version of the software application on the client device;
downloading on the client device a remaining portion of start-up data configured to render a complete version of the software application,
wherein the remaining portion of start-up data comprises at least one asset configured to replace a placeholder asset in the operable version of the software application; and
providing the complete version of the software application on the client device.

11. The system of claim 10, wherein initiating the software application comprises:
requesting a manifest file from a content delivery network, the manifest file comprising an identification of the initial portion of start-up data and the remaining portion of start-up data.

12. The system of claim 10, wherein the initial portion of start-up data comprises interim metadata for the software application.

13. The system of claim 10, wherein the operable version of the software application comprises a primitive rendering of at least one image, graphical element, animation, video, or sound from the complete version of the software application.

14. The system of claim 10, wherein the operable version and the complete version comprise an identical functionality.

15. The system of claim 10, wherein the operable version is identical to the complete version, other than at least one of a graphics quality or a sound quality.

16. The system of claim 10, wherein downloading the remaining portion of start-up data comprises:
enabling the user to interact with the operable version.

17. The system of claim 10, wherein downloading the remaining portion of start-up data comprises:
determining a current state of the software application; and
prioritizing a first subset of the remaining portion of start-up data for download over a second subset of the remaining portion of start-up data, based on the determination of the current state.

18. The system of claim 10, wherein the remaining portion of start-up data comprises at least one of image data or 3D object data.

19. An article for reducing a start-up time for a software application installed on a client device, comprising:
a non-transitory computer-readable medium having instructions stored thereon that, when executed by one or more computer processors, cause the computer processors to perform operations comprising:
initiating the software application installed on the client device;
downloading on the client device an initial portion of start-up data configured to render an operable version of the software application,
wherein the initial portion of start-up data comprises at least one of a user interface layout, an image dimension, a mesh dimension, a length of an animation, positional data, or spatial data;
providing the operable version of the software application on the client device;
downloading on the client device a remaining portion of start-up data configured to render a complete version of the software application,
wherein the remaining portion of start-up data comprises at least one asset configured to replace a placeholder asset in the operable version of the software application; and
providing the complete version of the software application on the client device.

* * * * *